United States Patent Office 3,718,084
Patented Feb. 27, 1973

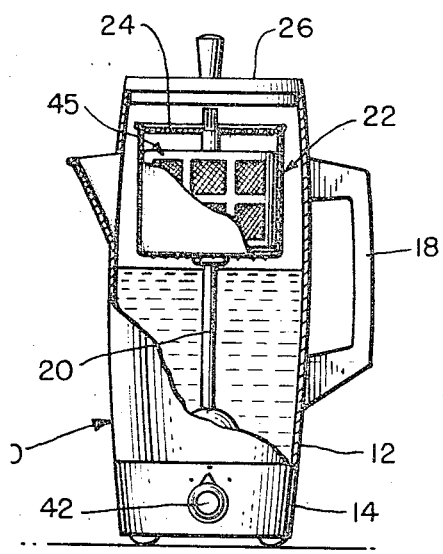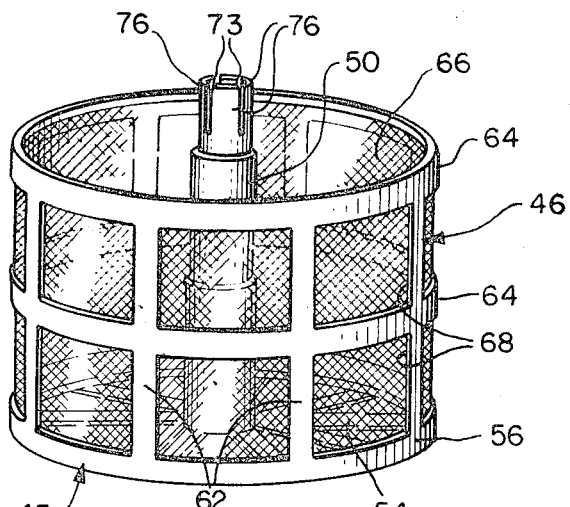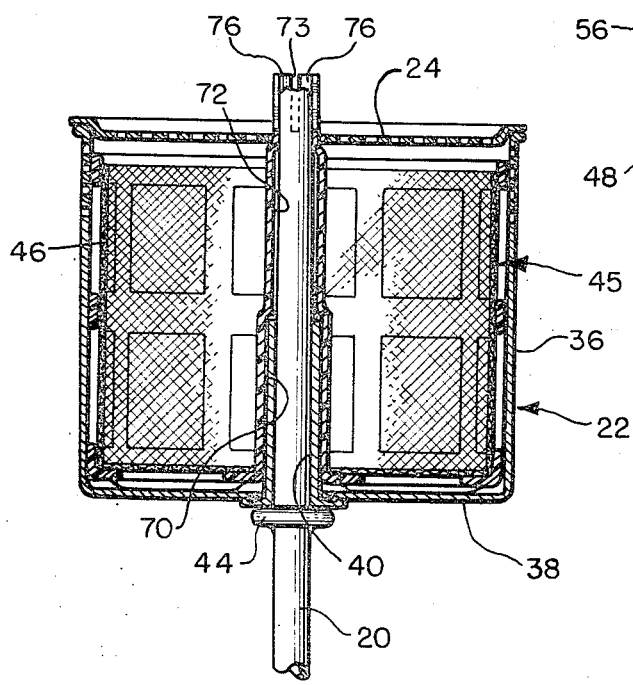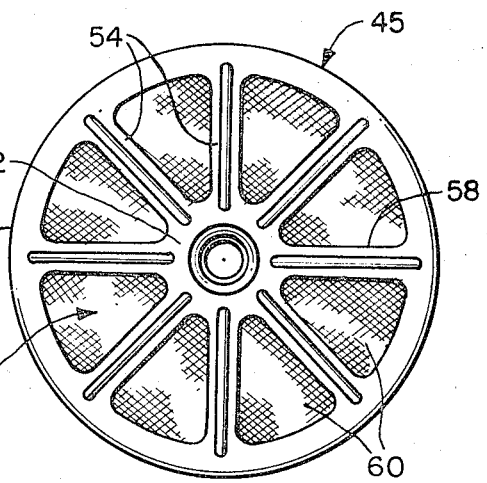

3,718,084
COFFEE MAKER BASKET AND FILTER
Dale E. Bufkin and Willard G. Murphy, Macon, Mo., assignors to McGraw-Edison Company, Elgin, Ill.
Filed Nov. 9, 1971, Ser. No. 197,081
Int. Cl. A47j 31/08
U.S. Cl. 99—312                    8 Claims

ABSTRACT OF THE DISCLOSURE

A basket filter for a percolator type coffee maker having a vessel and percolator tube supported therein, the basket filter having a stem which fits loosely over the tube until restrained thereon by the coffee maker basket or by shoulders on the tube, the top end of the stem extending along the tube and being of plastic or other flexible insulating material and having resilient tabs defined thereon which can be squeezed against the underlying tube for gripping same and simultaneously removing the tube, coffee maker basket and the basket filter from the vessel.

---

In a coffee maker of the percolator type, a tube extends upwardly within a vessel and supports at the top end thereof a basket for coffee grounds. Heated water is discharged from the tube top to drain by gravity through the coffee grounds, and it frequently is desired after the coffee has been made to remove the basket and the tube from the vessel. Because the tube and basket are hot and well above the temperature most people find comfortable, this normally simple task is quite difficult.

This invention relates to, and an object of this invention is to provide, a basket or filter structure which can be supported on a percolator tube in the coffee maker basket or by itself, where the stem structure overlying the percolator tube is of a low heat conductive flexible plastic material which can be comfortably squeezed against the tube to grip same for simultaneously removing the tube, coffee maker basket and basket or filter structure from the coffee maker.

This invention will be more fully understood and appreciated after reviewing the following specification, the accompanying drawing forming a part thereof, wherein:

FIG. 1 is a broken away elevational view of a typical coffee maker showing the preferred embodiment of the subject invention incorporated therein;

FIG. 2 is a perspective view of the basket filter element which forms the subject matter of this invention;

FIG. 3 is a bottom view of the element shown in FIG. 2; and

FIG. 4 is a sectional view of the basket filter element of FIGS. 2 and 3 shown in operative association with the percolator tube, coffee basket and spreader.

In the drawing, coffee maker 10 shown has a liquid tight vessel 12 supported on a heat insulated base 14 with a heat insulated handle 18 provided for holding the vessel. A percolator tube 20 extends up from the bottom of the vessel and supports at its upper end a coffee basket 22 including a perforated spreader 24, and a cover 26 fits on the open top of the vessel spaced above these components. The basket 22 conventionally has a cylindrical side wall 36 (FIG. 4) and a perforated base wall 38 with an upstanding sleeve 40 staked to the base wall adaptable to fit freely over the tube. A ring projection 44 on the tube supports the basket sleeve where the top end of the tube projects beyond the spreader screen 24. The vessel 12, tube 20, basket 22, spreader 24, and cover 26 are typically of rustproof metal such as of stainless steel or aluminum.

To make coffee, the vessel can be filled with water to just below the basket 22 and the water is heated and pumped up the tube for discharge onto the spreader 24 to flow by gravity uniformly to and through coffee grounds carried in the basket 22. The base wall perforations of the coffee basket allow the liquid to drip back to the vessel but are sufficiently small to preclude the free transfer of most coffee grounds. A control knob 42 can be adjusted to determine the length of brewing for weak or strong coffee. After the coffee is brewed, it frequently is desirable to remove the basket, spreader and tube from the vessel before the vessel is tilted to serve the coffee from the pour spout.

The basket filter element 46 shown in FIGS. 2 and 3 represent an improvement which can be used with the conventional basket 22 or can be used by itself without the basket.

The basket 45 has a cylindrical wall 46 and a base wall 48 with a stem 50 extending upwardly from the base wall. The base wall has a central core 52 integral with the stem 50 and radial arms 54 therefrom to a circumferential ring element 56, where openings 58 defined between the core 52, arms 54 and ring 56 are covered with a fine screen element 60. The circumferential wall 46 is formed of axial bars 62 upstanding from the arms 54 and circumferential ring elements 64 disposed parallel to the ring element 56. Screen 66 is secured to the inside of the wall and covers the openings 68 formed between the bars 62 and the ring elements 64.

The stem has a stepped inside diameter where the lower portion 70 is sufficiently large to fit loosely over the sleeve 40 of the basket while the top portion 72 of the bore is sized to fit loosely over the tube 22 while yet having only moderate degree of side play. The circumferential wall 46 is small enough to fit within the basket 22, while also the bottom opening of the stem is sufficiently small to rest on and be restrained against the projection 44 should the basket 22 be omitted. The top stem end preferably extends above the top of the percolator tube as indicated in FIG. 4, and moreover has axial slits 73 therein which define therebetween a plurality of flexible tabs 76.

The basket frame is preferably formed of a plastic material, such as polypropylene, which is relatively strong and light weight but yet economical to fabricate. The screen is preferably a polyester, where the bottom screen 60 might have 120 to 160 openings per square inch while the sidewall screen 66 might have 150 to 190 openings per square inch. The stem frame being of a plastic material is somewhat flexible and moreover has a low thermal or heat conductivity. The tabs 76 are for example ¼ to ½" in axial length and preferably extend above the spreader this distance and moreover beyond the end of the tube some small distance to completely shield the hot metal tube. The tabs upon gripping by the user can be squeezed against the underlying tube to frictionally hold the tube.

To remove the tube and the basket from the coffee maker, even immediately after coffee is perked, the cover 26 can be removed and the user can grip the tabs 76 of the basket filter 44 and deflect them against the underlying percolator tube. Since the tabs are of a low thermal conductivity material the temperature even though it might be the same as the liquid coffee, is not sensed as being that hot and the heat energy in the immediate surface of the tabs is readily absorbed by the user with no or at most only minimum heat discomfort. The tube and all components on the tube can thus be easily removed in one operation from the coffee maker even almost immediately after coffee is freshly brewed in the vessel.

What is claimed is:

1. In a coffee maker having a vessel for holding liquid and heating same, a percolator tube supported in the vessel, and a coffee basket supported on the tube, the combination of a stem having an inner bore sufficiently large to fit loosely over the tube until restrained thereon whereas the top end of the stem extends upwardly beyond the coffee basket, and the top stem end being formed of a heat insulating type of material such as a plastic and further being easily deflectable and extending approximately ¼ to ½" axially of the tube whereby it can be squeezed against the tube for frictionally gripping same to allow simultaneous removal of the stem, tube and coffee basket from the coffee maker even almost immediately after coffee has been made in the vessel.

2. The combination according to claim 1, further including a spreader plate supported on the basket and having an opening, whereby the tube end and top stem end protrude through the opening and above the spreader plate a distance of order of ¼ to ½".

3. The combination according to claim 1, further providing perforated frame means rigidly connected to the stem, and a fine mesh filter element secured to the frame means and disposed to fit in the coffee basket.

4. The combination according to claim 3, wherein the frame means and stem are integrally formed as a single piece.

5. For use in a coffee maker having a percolator tube, a coffee basket filter adapted to be supported on the tube, the basket filter having a stem with an inner bore sufficiently large to fit loosely over the tube until restrained thereon, a perforated base wall secured to the stem and extended crosswise thereto and a perforated circumferential wall secured to the base wall and upstanding therefrom in outwardly spaced relation to the stem, a fine mesh screen secured over the base and circumferential walls and having approximately 120 to 190 openings per square inch, the top stem end extending upwardly beyond the top edge of the circumferential wall approximately ¼ to ½" and being formed of a flexible heat insulating type of material such as a plastic and having axial slots therein to define easily deflectable tabs, whereby the tabs can be manually deflected against the tube for frictionally gripping same to allow simultaneous removal of the stem and tube from the coffee maker even almost immediately after coffee has been made therein.

6. The coffee basket filter according to claim 5, wherein the stem has a stepped inside base which is smaller at the top end and sized only slightly larger than the tube to fit loosely over the tube and which is larger at the lower end to fit easily over the tube and even over a sleeve on the tube.

7. The coffee basket filter according to claim 5, wherein the stem is formed of a polypropylene plastic, and wherein the fine mesh screen is formed of a polyester plastic.

8. The coffee basket filter according to claim 5, further including a spreader plate having an opening therein adapted to be fitted over the top stem whereby as assembled the flexible stem tabs are above the spreader plate and are exposed.

References Cited
UNITED STATES PATENTS

| | | | |
|---|---|---|---|
| 1,309,374 | 7/1919 | Swan | 99—311 |
| 2,204,158 | 6/1940 | Serio | 99—310 |
| 3,592,126 | 7/1971 | Dombrowik | 99—312 |
| 3,669,694 | 6/1972 | Nauheimer | 99—310 |

ROBERT W. JENKINS, Primary Examiner